United States Patent
Goebel

[15] 3,670,190
[45] June 13, 1972

[54] ELECTRIC MOTOR AND HIGHER SPEED FAN ASSEMBLY
[72] Inventor: Robert W. Goebel, Springfield, Ohio
[73] Assignee: Robbins & Myers, Inc., Springfield, Ohio
[22] Filed: March 11, 1971
[21] Appl. No.: 123,354

[52] U.S. Cl. .............................................. 310/60, 310/83
[51] Int. Cl. ................................................... H02k 9/06
[58] Field of Search ................................... 310/60–63, 83

[56] References Cited

UNITED STATES PATENTS 2,958,794   11/1960   Mann ............................... 310/83 X

FOREIGN PATENTS OR APPLICATIONS 114,549   4/1918   Great Britain .......................... 310/60

Primary Examiner—D. X. Sliney
Attorney—William R. Jacox

[57] ABSTRACT

A stator and a rotor of an electric motor are enclosed within a housing which also encloses a fan mounted for rotation with respect to the rotor shaft. The housing also encloses a transmission unit which connects the fan to the rotor shaft for rotation of the fan at a speed substantially higher than that of the rotor shaft. Preferably, the transmission unit incorporates a stub shaft which is supported for rotation in parallel spaced relationship to the rotor shaft and is connected to the rotor shaft and the fan hub by corresponding sets of drive wheels.

6 Claims, 1 Drawing Figure

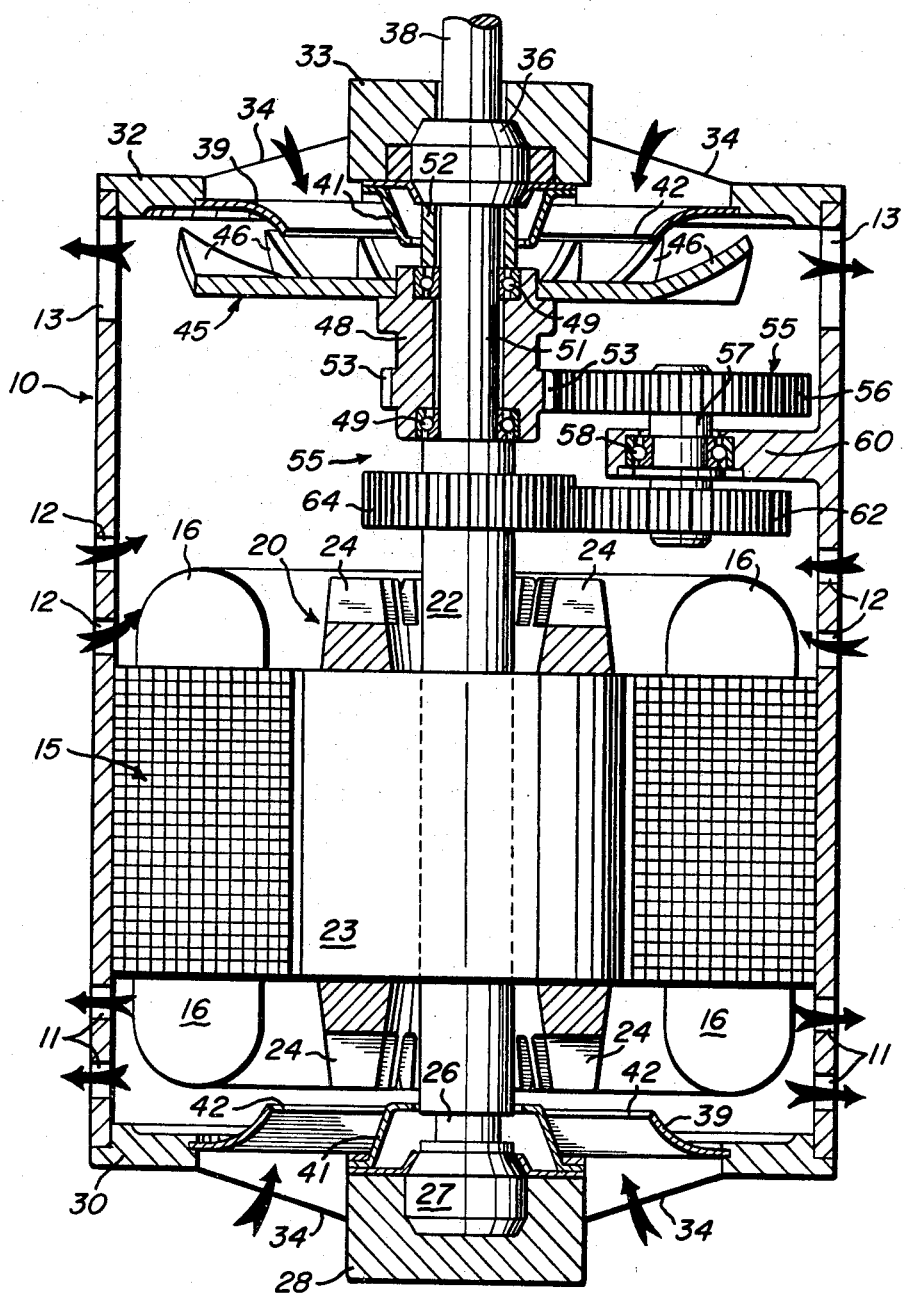
INVENTOR
ROBERT W. GOEBEL
BY William R Jacox
ATTORNEY 3,670,190

ELECTRIC MOTOR AND HIGHER SPEED FAN ASSEMBLY

BACKGROUND OF THE INVENTION

In an electric motor such as a universal motor or an induction motor or the like, it is common to secure a cooling fan to the rotor shaft either within the motor housing or directly outside the housing. The fan is conventionally driven by the rotor shaft and at the same rate of rotation and serves to cool the stator and rotor so that the motor does not overheat when operating at the rated power output. Typical such motors are disclosed in U.S. Pat. No. 1,996,460, No. 2,604,501 and No. 2,690,513. It has also been proposed to operate a fan with a separate electric motor within or adjacent the motor housing. Such forms of separate motor drives are illustrated in U. S. Pat. No. 2,613,240, No. 2,787,720, and No. 3,456,141. In the former group of patents, the air cooling of the motor is limited by the rate of rotation of the motor shaft, the pitch of the fan blades, and by the diameter of the fan. In the second group of patents, the use of the separate fan motor significantly increases the cost of the overall motor assembly.

SUMMARY OF THE INVENTION

The present invention is directed to an improved electric motor and fan assembly which provides for substantially increasing the flow of cooling air through the motor housing without significantly increasing the cost of the motor assembly. In general, this is accomplished by driving the fan at a rate substantially faster than the rotor shaft through a transmission which is simple and compact in construction and easily assembled within the motor housing.

In accordance with a preferred embodiment of the invention, an electric motor includes a housing which supports a stator and opposite end portions of a rotor shaft. A cooling fan is enclosed within the housing and is secured to a support hub which is rotatably mounted on the rotor shaft by a set of anti-friction bearings. The fan hub includes an integral gear which is driven by a substantially larger gear member mounted on one end portion of a stud shaft, rotatably supported by an anti-friction bearing retained within the housing.

Another gear member is mounted on the opposite end portion of the stub shaft and is driven by a pinion or gear member secured to the rotor shaft adjacent the fan hub. The fan may be driven approximately twice the speed of the rotor, and suitable openings are provided within the motor housing for directing a high volume of cooling air into the housing and through the rotor and stator. Thus, the power output rating of a given motor may be significantly increased or the physical size of a motor of a given power rating may be reduced.

Other objects and advantages of the motor and fan assembly of this invention may relate to the construction of parts and the combination thereof, as will become more apparent in the following disclosure.

BRIEF DESCRIPTION OF THE DRAWING

The FIGURE of the drawing is an axial sectional view of an electric motor incorporating a fan constructed and driven in accordance with the present invention.

DESCRIPTION OF THE PREFERRED EMBODIMENT

The motor disclosed in the drawing includes a generally cylindrical metal shell or housing 10 having a series of circumferentially spaced small air exhaust holes or openings 11 within one end portion and a corresponding series of circumferentially spaced inlet openings 12 within its center portion. A series of substantially large air exhaust openings 13 are circumferentially spaced within the opposite end portion of the housing 10 and cooperate with the openings 11 and 12 to provide for the flow of cooling air through the housing as indicated by the arrows.

An annular stator 15 includes a stack of laminations having slots (not shown) through which extend windings 16, adapted to be connected to a suitable source of electrical energy. A rotor 20 is positioned within the stator 15 and includes an elongate shaft 22 which extends through a rotor body 23, which has axially projecting vanes 24 projecting from each end thereof.

The shaft 22 includes a rearward end portion 26 which is rotatably supported by a sleeve bearing 27, retained within an enclosure 28, which is attached to an end plate 30, which is attached to the housing 10. An end plate 32 is mounted on the opposite end portion of the housing 10 and has a bearing enclosure 33. Each bearing enclosure 28 and 33 is supported by circumferentially spaced integral radial ribs 34 which define air inlet passages therebetween. A sleeve bearing 36 is retained by the enclosure 33 and rotatably supports an outwardly projecting end portion 38 of the rotor shaft 22. An annular deflector 39 is secured to each of the end plates 30 and 32 to define a corresponding annular air inlet opening 42.

In accordance with the present invention, a cooling fan 45 is positioned within the housing 10 adjacent the end plate 32 and includes a series of outwardly projecting peripherally spaced curved blades or vanes 46. The fan 45 is mounted on a tubular sleeve-like support hub 48 which is rotatably supported by a pair of anti-friction bearings 49 which are mounted on a reduced intermediate portion 51 of the rotor shaft 22. A tubular spacer or sleeve 52 extends between the outermost bearing 49 and the main rotor shaft support bearing 36. The support hub 48 includes an integrally formed wheel or spur gear 53 which forms part of a drive transmission unit 55. The transmission unit 55 also includes an intermediate wheel or gear 56 which is mounted on one end portion of an auxiliary stub shaft 57. The stub shaft 57 is rotatably supported by an anti-friction bearing 58 retained within a flange 60 which projects inwardly within the housing 10 and forms an integral part of the housing 10.

The transmission unit 55 further includes another intermediate wheel or gear 62 which is mounted on the opposite end portion of the stub shaft 57. The gear 62 is driven by a pinion or gear 64 which is secured to the rotor shaft 22 adjacent the inner end of the fan support hub 48.

The gears 62 and 64 are shown as having the same diameter so that the stub shaft 57 is driven at the same speed as the rotor shaft 22. The intermediate gear 56, however, has a diameter which is substantially twice that of the driven gear 53 on the fan support hub 48, so that the fan 45 is driven at a speed twice that of the rotor shaft 22. A speed ratio of 2:1 is illustrated with regard to the fan 45 and the shaft 22. However, it is to be understood that the fan 45 may be driven at any speed greater than that of the rotor shaft 22 without departing from the scope of the invention. Thus, the ratio of the diameters of the gear 62 to the gear 64 and the gear 53 to the gear 55 may be different from those shown.

When the rotor 20 and the shaft 22 are rotating at a given rate, and as the fan 45 is being driven at a higher rate, through the transmission gears 53, 56, 62 and 64, air is drawn inwardly into the housing 10 through both of the end openings 42 and also inwardly through the intermediate openings 12 within the housing 10 and past the windings 16. The air is forced outwardly by the fan 45 through the openings 13 within the housing 10. Part of the air flowing through the openings 42, flows axially through the air gap between the stator 15 and the rotor 20, and the other portion of the air is forced outwardly by the rotor vanes 24, past the windings 16 and through the housing openings 11. The high volume flow of cooling air through the housing 10, as created by the higher speed fan 45, provides extremely effective cooling of the electric motor and thereby significantly increases the power output rating of the motor.

Another important advantage provided by an electric motor constructed in accordance with the invention, is the simple and compact construction and assembly of the fan 45 and its driving transmission 55 within the motor housing 10. That is, the stub shaft 57 and the gears 56 and 62 may be readily assembled onto the flange portion 60 of the housing 10, and the drive gear 64 and fan support hub 48 may be readily mounted on the rotor shaft 22 before the end plate 32 is mounted on the housing 10.

The higher speed cooling fan 45 provides highly effective cooling of the stator 15 and the rotor 20. However, the higher speed fan arrangement disclosed herein may be applied to the cooling of another device adjacent the motor or for cooling the environmental air surrounding the motor. It is further apparent that the simple drive transmission 55 for the fan 45, including the meshing sets of spur gears 53 and 56, and 62 and 64, can be inexpensively constructed. While positive drive spur gears are shown, it is to be understood that the fan 45 may also be driven by a friction drive transmission wherein each of the gears 53, 56, 62 and 64 is replaced by wheels having a slightly resilient high friction outer surface.

Although the preferred embodiment of the electric motor and fan assembly has been described, it will be understood that within the purview of this invention, various changes may be made in the form, details, proportion and arrangement of parts, the combination thereof and mode of operation, which generally stated consist of a device capable of providing the features set forth and as defined in the appended claims.

I claim:

1. An improved electric motor comprising:
a housing,
a stator within said housing,
a rotor within said stator and including a main shaft,
bearing means carried by said housing and supporting said main shaft for rotation thereof,
a cooling fan disposed within said housing,
a tubular hub member secured to said fan,
said main shaft having an end portion extending through said hub member,
bearing means mounted on said rotor shaft and rotatably supporting said hub member,
transmission means within said housing and including a stub shaft positioned in substantially parallel spaced relation to said main shaft,
a first set of drive wheels connecting said main shaft to said stub shaft,
a second set of drive wheels connecting said stub shaft to said hub member,
a flange projecting inwardly from said housing between said first and second sets of drive wheels,
bearing means mounted on said flange and supporting said stub shaft between said set of drive wheels, and
said transmission means being effective to rotate said cooling fan at a rate substantially higher than the rate of rotation of said main shaft to provide a more effective flow of cooling air within said housing.

2. An electric motor as defined in claim 1 wherein each said set of drive wheels comprise intermeshing gears.

3. An electric motor as defined in claim 1 wherein each said set of drive wheels comprise two intermeshing gears, one of said gears of said first set being secured to said main shaft, and one of said gears of said second set being an integral part of said hub member.

4. An electric motor as defined in claim 1 which includes means defining openings in said housing to provide for circulation of air through said housing in response to rotation of said cooling fan.

5. An improved electric motor comprising:
a housing,
a stator within said housing,
a rotor within said stator and including a rotor shaft supporting a rotor body,
bearing means carried by said housing and supporting said rotor shaft and said rotor body for rotation,
a cooling fan disposed within said housing,
an annular hub mounted on said rotor shaft for relative rotation and supporting said cooling fan,
a transmission disposed within said housing between said cooling fan and said stator,
said transmission including a first drive wheel mounted on said rotor shaft between said hub and said rotor body,
a second drive wheel on said hub and positioned between said first drive wheel and said cooling fan,
third and fourth drive wheels positioned between said cooling fan and said stator and engaging said first and second drive wheels respectively,
an auxiliary shaft positioned between said stator and said cooling fan,
a support member projecting generally radially inwardly from said housing between said stator and said cooling fan and supporting said auxiliary shaft,
said auxiliary shaft supporting said second and third drive wheels for rotation as a unit on an offset axis extending parallel to the axis of said rotor shaft, and
said transmission being effective to rotate said cooling fan at a rate substantially higher than the rate of rotation of said rotor shaft.

6. An improved electric motor comprising:
a housing including a set of end walls connected by a generally cylindrical intermediate wall,
a stator within said housing,
a rotor within said stator and including a main shaft,
bearing means carried by said housing and supporting said main shaft for rotation thereof,
a cooling fan disposed within said housing,
an annular hub member secured to said fan,
said main shaft having an end portion extending through said hub member,
bearing means mounted on said rotor shaft and rotatably supporting said hub member,
transmission means within said housing and including an auxiliary shaft positioned in substantially parallel spaced relation to said main shaft,
a first set of drive wheels connecting said main shaft to said auxiliary shaft,
a second set of drive wheels connecting said auxiliary shaft to said hub member.
said housing including a support member projecting generally radially inwardly from said housing intermediate said end walls and supporting said auxiliary shaft, and
said transmission means being effective to rotate said cooling fan at a rate substantially higher than the rate of rotation of said main shaft to provide a more effective flow of cooling air within said housing.

* * * * *